US008812657B2

(12) United States Patent
Mallik et al.

(10) Patent No.: US 8,812,657 B2
(45) Date of Patent: Aug. 19, 2014

(54) NETWORK-ASSISTED PEER DISCOVERY

(75) Inventors: Siddhartha Mallik, San Diego, CA (US); Renqiu Wang, San Diego, CA (US); Ravi Palanki, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 13/085,306

(22) Filed: Apr. 12, 2011

(65) Prior Publication Data
US 2011/0258313 A1 Oct. 20, 2011

Related U.S. Application Data

(60) Provisional application No. 61/324,606, filed on Apr. 15, 2010, provisional application No. 61/360,705, filed on Jul. 1, 2010.

(51) Int. Cl.
| | |
|---|---|
| *G06F 15/173* | (2006.01) |
| *H04W 8/00* | (2009.01) |
| *H04L 29/08* | (2006.01) |
| *H04W 76/02* | (2009.01) |
| *H04W 84/18* | (2009.01) |

(52) U.S. Cl.
CPC ........... *H04W 8/005* (2013.01); *H04L 67/1068* (2013.01); *H04L 67/1061* (2013.01); *H04W 76/023* (2013.01); *H04W 84/18* (2013.01)
USPC ........... 709/224; 709/203; 709/223; 709/243; 370/338

(58) Field of Classification Search
CPC .............. H04L 67/1061; H04L 67/1068
USPC ................. 709/202, 203, 223, 224, 227, 243; 370/328, 338
See application file for complete search history.

(56) References Cited

U.S. PATENT DOCUMENTS 7,206,841 B2 * 4/2007 Traversat et al. .............. 709/225
7,272,636 B2 * 9/2007 Pabla ............................ 709/223
(Continued)

FOREIGN PATENT DOCUMENTS

| EP | 1253766 A2 | 10/2002 |
| EP | 2161962 A1 | 3/2010 |
(Continued)

OTHER PUBLICATIONS

International Search Report—PCT/US2011/032676—ISA/EPO—Oct. 28, 2011.

(Continued)

*Primary Examiner* — Ramy M Osman
(74) *Attorney, Agent, or Firm* — James K. O'Hare

(57) ABSTRACT

Techniques for performing network-assisted peer discovery to enable peer-to-peer (P2P) communication are described. In one design, a device registers with a network entity (e.g., a directory agent) so that the presence of the device and possibly other information about the device can be made known to the network entity. The network entity collects similar information from other devices. The device sends a request to the network entity, e.g., during or after registration. The request includes information used to match the device with other devices, e.g., information about service(s) provided by the device and/or service(s) requested by the device. The directory agent matches requests received from all devices, determines a match between the device and at least one other device, and sends a notification to perform peer discovery. The device performs peer discovery in response to receiving the notification from the network entity.

22 Claims, 7 Drawing Sheets

(56) References Cited

U.S. PATENT DOCUMENTS

| | | | |
|---|---|---|---|
| 7,984,132 B2* | 7/2011 | Park et al. | 709/223 |
| 8,189,508 B2* | 5/2012 | Park et al. | 370/328 |
| 8,214,489 B2* | 7/2012 | Ballette et al. | 709/224 |
| 2002/0156875 A1* | 10/2002 | Pabla | 709/220 |
| 2002/0184304 A1 | 12/2002 | Meade et al. | |
| 2002/0184357 A1* | 12/2002 | Traversat et al. | 709/223 |
| 2003/0235174 A1 | 12/2003 | Pichna et al. | |
| 2004/0044727 A1* | 3/2004 | Abdelaziz et al. | 709/203 |
| 2005/0188062 A1 | 8/2005 | Li et al. | |
| 2006/0013219 A1* | 1/2006 | Neilson et al. | 370/389 |
| 2006/0046709 A1* | 3/2006 | Krumm et al. | 455/422.1 |
| 2006/0165035 A1 | 7/2006 | Chandra et al. | |
| 2006/0165040 A1* | 7/2006 | Rathod et al. | 370/335 |
| 2007/0008922 A1 | 1/2007 | Abhishek et al. | |
| 2009/0285119 A1 | 11/2009 | Horn et al. | |
| 2009/0287827 A1* | 11/2009 | Horn et al. | 709/227 |
| 2009/0323647 A1* | 12/2009 | Park et al. | 370/338 |
| 2009/0327395 A1* | 12/2009 | Park et al. | 709/202 |
| 2010/0049846 A1* | 2/2010 | Ballette et al. | 709/224 |
| 2010/0254308 A1* | 10/2010 | Laroia et al. | 370/328 |
| 2011/0191187 A1* | 8/2011 | Charbit et al. | 705/14.4 |
| 2014/0092885 A1* | 4/2014 | Venkatachalam et al. | 370/338 |

FOREIGN PATENT DOCUMENTS

| | | |
|---|---|---|
| JP | H09187056 A | 7/1997 |
| WO | 2006081123 A2 | 8/2006 |
| WO | WO2007044597 | 4/2007 |
| WO | WO2010005348 A1 | 1/2010 |
| WO | WO2010078271 A2 | 7/2010 |

OTHER PUBLICATIONS

Written Opinion—PCT/US2011/032676—ISA/EPO—Oct. 28, 2011.

* cited by examiner

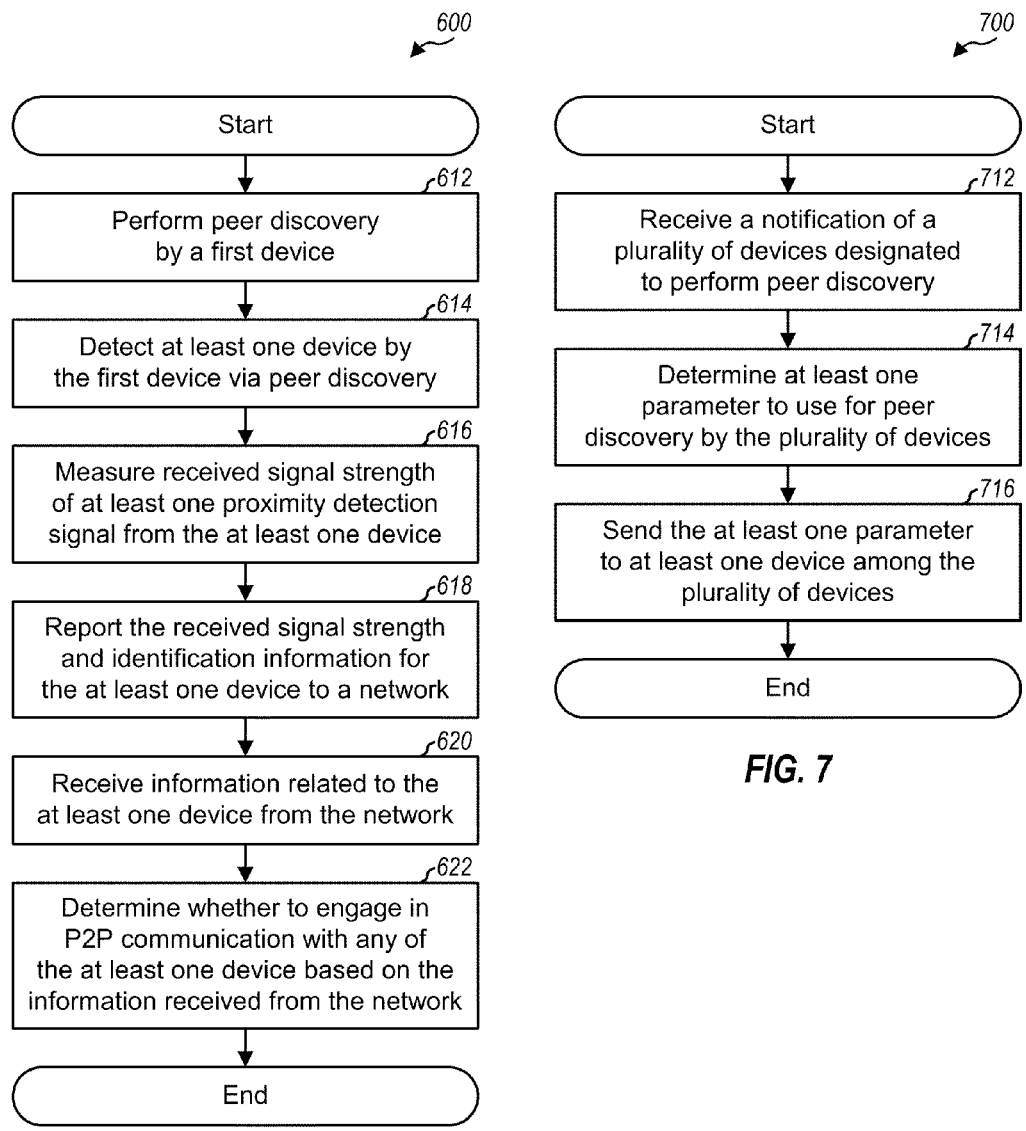

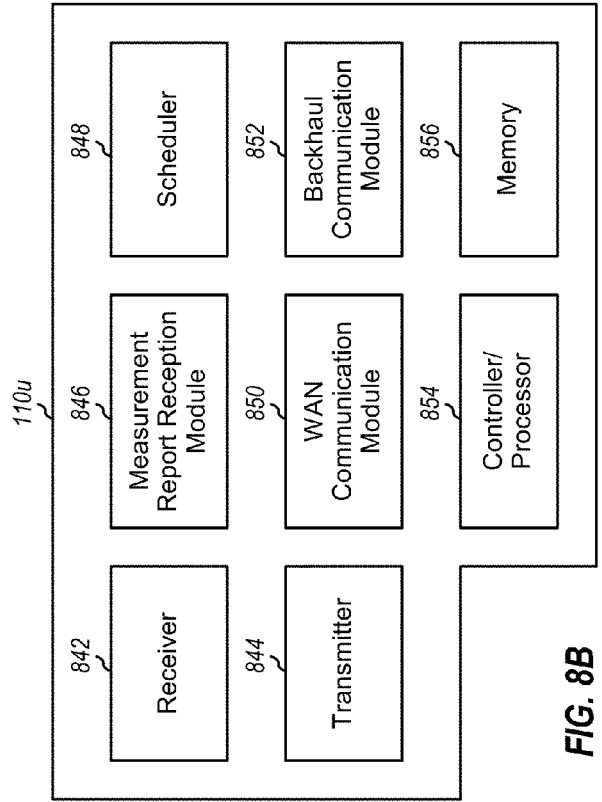
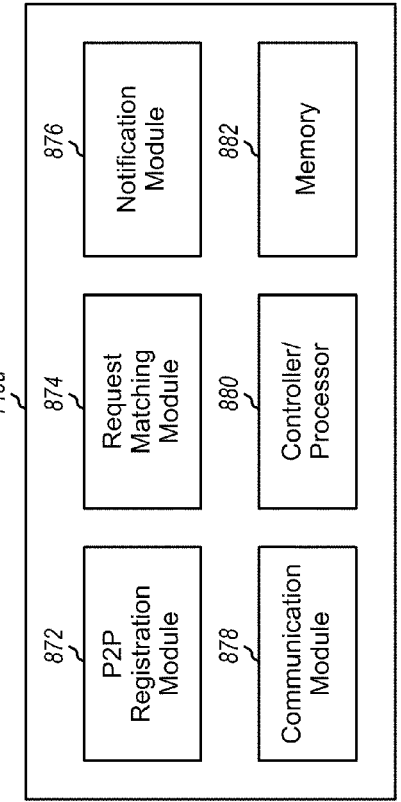
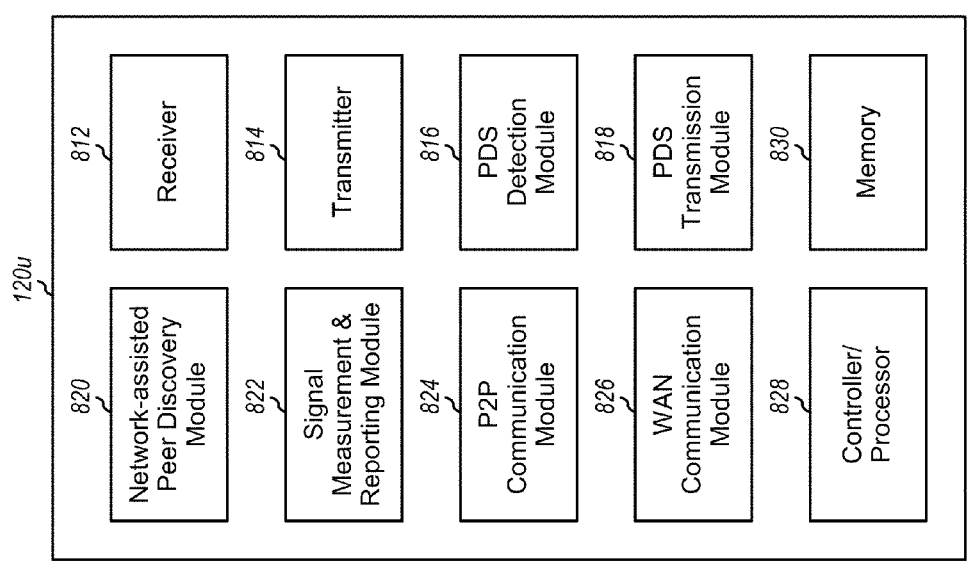
FIG. 8A
FIG. 8B
FIG. 8C

NETWORK-ASSISTED PEER DISCOVERY

The present application claims priority to provisional U.S. Application Ser. No. 61/324,606, entitled "METHOD AND APPARATUS THAT FACILITATES NETWORK ASSISTED DISCOVERY IN PEER-TO-PEER SYSTEMS," filed Apr. 15, 2010, and provisional U.S. Application Ser. No. 61/360,705, entitled "NETWORK-ASSISTED PEER DISCOVERY," filed Jul. 1, 2010, both incorporated herein by reference in their entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of devices. A device may communicate with a base station via the downlink and uplink. The downlink (or forward link) refers to the communication link from the base station to the device, and the uplink (or reverse link) refers to the communication link from the device to the base station. The device may also be able to communicate peer-to-peer with other devices. It may be desirable to efficiently support P2P communication between devices.

SUMMARY

Techniques for performing network-assisted peer discovery to enable P2P communication are described herein. In one design, for network-assisted peer discovery, a device may register with a network entity (e.g., a directory agent) so that the presence of the device and possibly other information about the device can be made known to the network entity. The network entity may collect similar information from other devices. The network entity may inform the device when other devices of interest may be within the vicinity of the device. The device may then perform peer discovery when informed by the network entity instead of all the time, which may reduce power consumption, extend battery life, and provide other benefits.

In one design, a first device may perform registration with a network entity (e.g., a directory agent) for assistance for peer discovery. For registration, the first device may send identification information, location information, service information, and/or other information for the first device to the network entity. The first device may send a request to the network entity, e.g., during or after registration. The request may include information used to match the first device with other devices, e.g., information indicative of service(s) provided by the first device and/or service(s) requested by the first device. The first device may thereafter receive a notification from the network entity to perform peer discovery. The notification may be generated by the network entity based on a match between the first device and at least one other device. The match may be determined based on the request from the first device and requests from other devices. The first device may perform peer discovery in response to receiving the notification from the network entity. The first device may perform peer discovery by (i) transmitting a proximity detection signal to enable other devices to detect the first device and/or (ii) detecting proximity detection signals from other devices. The notification may include pertinent information that may help reduce the amount of time taken to perform peer discovery.

Various aspects and features of the disclosure are described in further detail below.

BRIEF DESCRIPTION OF THE DRAWINGS

FIG. 6 shows a process for performing peer discovery.

FIG. 7 shows a process for supporting peer discovery.

FIG. 8A shows a block diagram of a design of a device.

FIG. 8B shows a block diagram of a design of a base station.

FIG. 8C shows a block diagram of a design of a directory agent.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
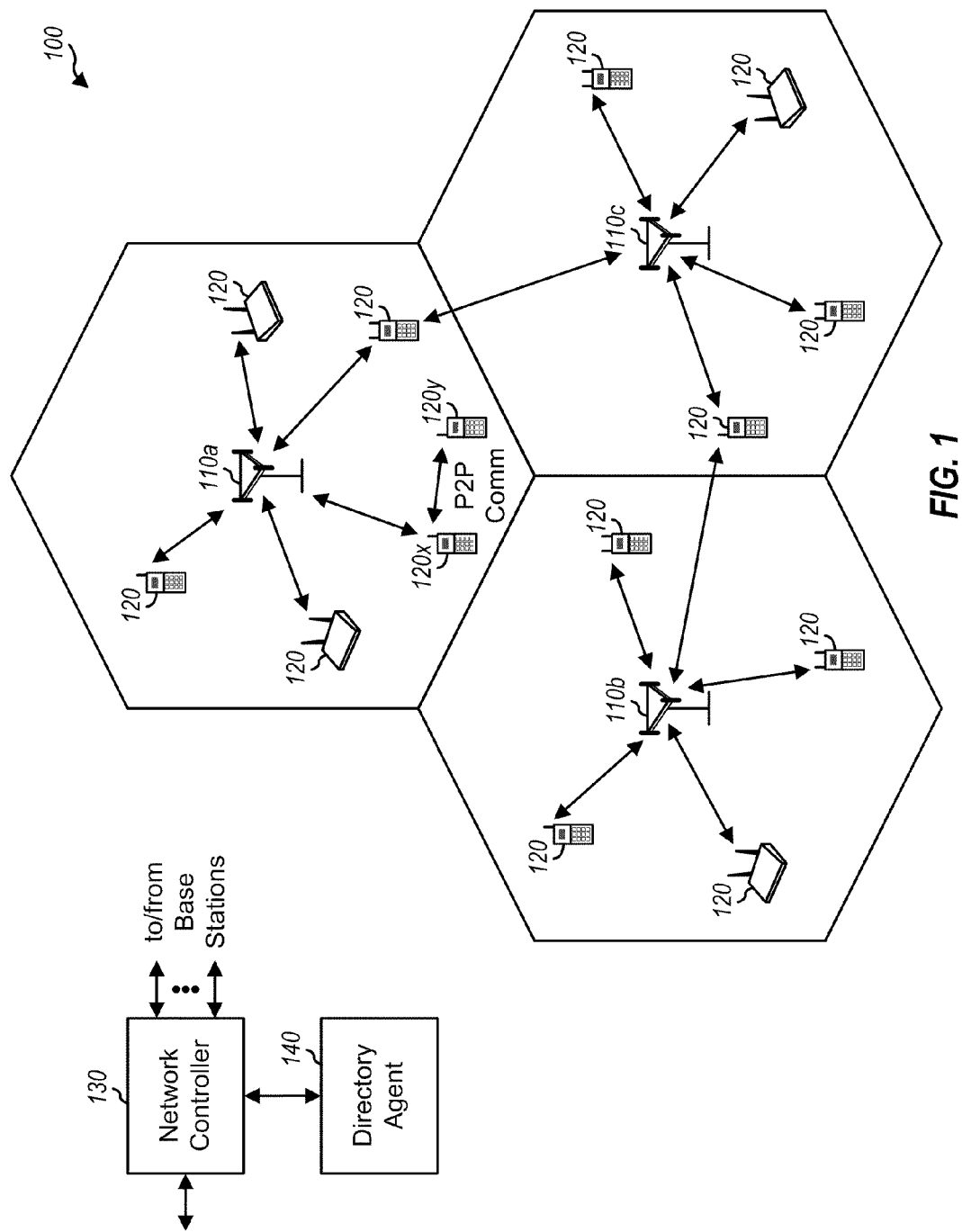
FIG. 1 shows a wireless communication network.

FIG. 1 shows a wireless communication network 100, which may be an LTE network or some other wireless network. Wireless network 100 may include a number of base stations and other network entities. For simplicity, only three base stations 110a, 110b and 110c, one network controller 130, and a directory agent 140 are shown in FIG. 1. A base station may be an entity that communicates with the devices and may also be referred to as a Node B, an evolved Node B (eNB), an access point, etc. Each base station 110 may provide communication coverage for a particular geographic area and may support communication for the devices located within the coverage area. To improve network capacity, the overall coverage area of a base station may be partitioned into multiple (e.g., three) smaller areas. Each smaller area may be served by a respective base station subsystem. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

Network controller 130 may couple to a set of base stations and may provide coordination and control for these base stations. Network controller 130 may be a single network entity or a collection of network entities. Network controller 130 may communicate with the base stations via a backhaul. The base stations may also communicate with one another, e.g., directly or indirectly via wireless or wireline backhaul. Directory agent 140 may be a separate network entity and may be coupled to network controller 130 (as shown in FIG. 1) and/or other network entities. Directory agent 140 may also be part of a base station, or network controller 130, or some other network entity (not shown in FIG. 1). Directory agent 140 may support peer discovery by devices, as described below. Directory agent 140 may also be referred to by other names.

Devices 120 may be dispersed throughout the wireless network, and each device may be stationary or mobile. A device may also be referred to as a user equipment (UE), a user device, a mobile station, a terminal, an access terminal, a subscriber unit, a station, etc. A device may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, a peripheral device (e.g., a printer), etc. A device may communicate with a base station in a wireless network. A device may also communicate peer-to-peer with other devices. In the example shown in FIG. 1, devices 120x and 120y may communicate peer-to-peer, and remaining devices 120 may communicate with base stations. Devices 120x and 120y may also be capable of communicating with base stations, e.g., when not engaged in P2P communication or possibly concurrent with P2P communication. P2P communication may be used to offload data traffic in order to reduce congestion on radio interface as well as a core network.

In the description herein, WAN communication refers to communication between a device and a base station, e.g., for a call with a remote station such as another device. P2P communication refers to direct communication between two or more devices, without going through a base station. Peer discovery refers to a process to detect other devices by a device.

One challenge in P2P communication is discovery/detection of peer devices of interest within a particular range, e.g., within radio frequency (RF) range. Devices that can and/or desire to communicate peer-to-peer may perform peer discovery autonomously. For autonomous peer discovery, a device may occasionally (e.g., periodically) transmit a proximity detection signal (PDS) to announce its presence and to enable other devices to detect the device. Alternatively or additionally, the device may detect other devices near its proximity based on proximity detection signals transmitted by these other devices. A proximity detection signal may also be referred to as a peer detection signal, a peer discovery signal, etc. A proximity detection signal may comprise a pilot and may carry identification information for a transmitter of the proximity detection signal and/or other information. A pilot is a signal that is known a priori by a transmitter and a receiver and may also be referred to as a reference signal, a preamble, etc.

A device may occasionally transmit and/or receive proximity detection signals for autonomous peer discovery, even when no other devices may be interested in communicating with the device. This may result in significant battery power consumption by the device, which may degrade standby battery life of the device.

In an aspect, network-assisted peer discovery may be used to aid devices perform peer discovery. In one design, for network-assisted peer discovery, a device may register with a network entity (e.g., a directory agent) so that the presence of the device and possibly other information about the device can be made known to the network entity. The network entity may collect similar information from other devices. The network entity may inform the device when other devices of interest may be within the vicinity of the device. The device may then perform peer discovery when informed by the network entity instead of all the time, which may reduce power consumption for peer discovery, extend battery life of the device, and provide other benefits.

Figure 2:
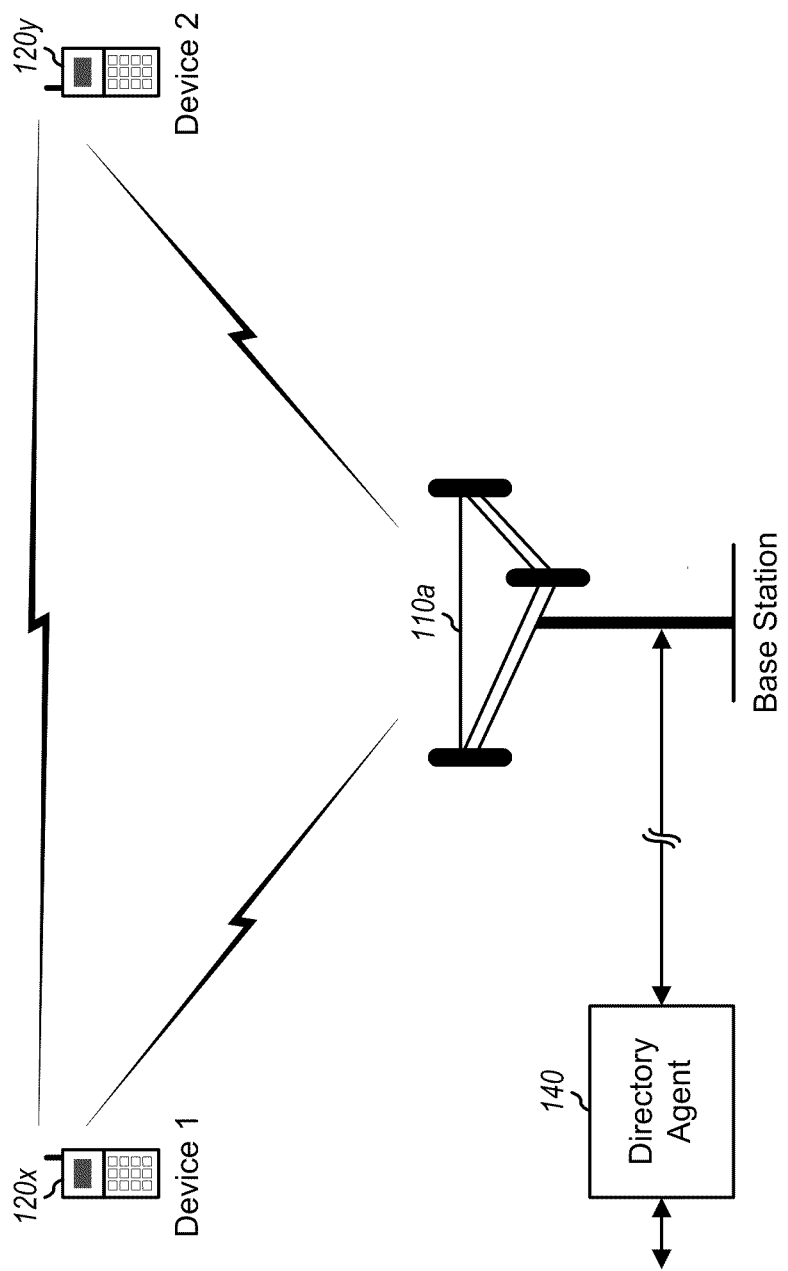
FIG. 2 shows communication between two devices, a base station, and a directory agent for network-assisted peer discovery.

FIG. 2 shows communication between two devices 120x and 120y and directory agent 140 via base station 110a for network-assisted peer discovery. Devices 120x and 120y may communicate with directory agent 140 via the same base station 110a or via different base stations for network-assisted peer discovery. Devices 120x and 120y may also communicate with base station 110a for WAN communication and also for scheduling of P2P communication. Devices 120x and 120y may transmit and receive proximity detection signals for peer discovery and may also communication peer-to-peer. Base station 110a may be a serving base station of device 120x and/or 120y. Directory agent 140 may assist devices 120x and 120y with peer discovery.

Figure 3:
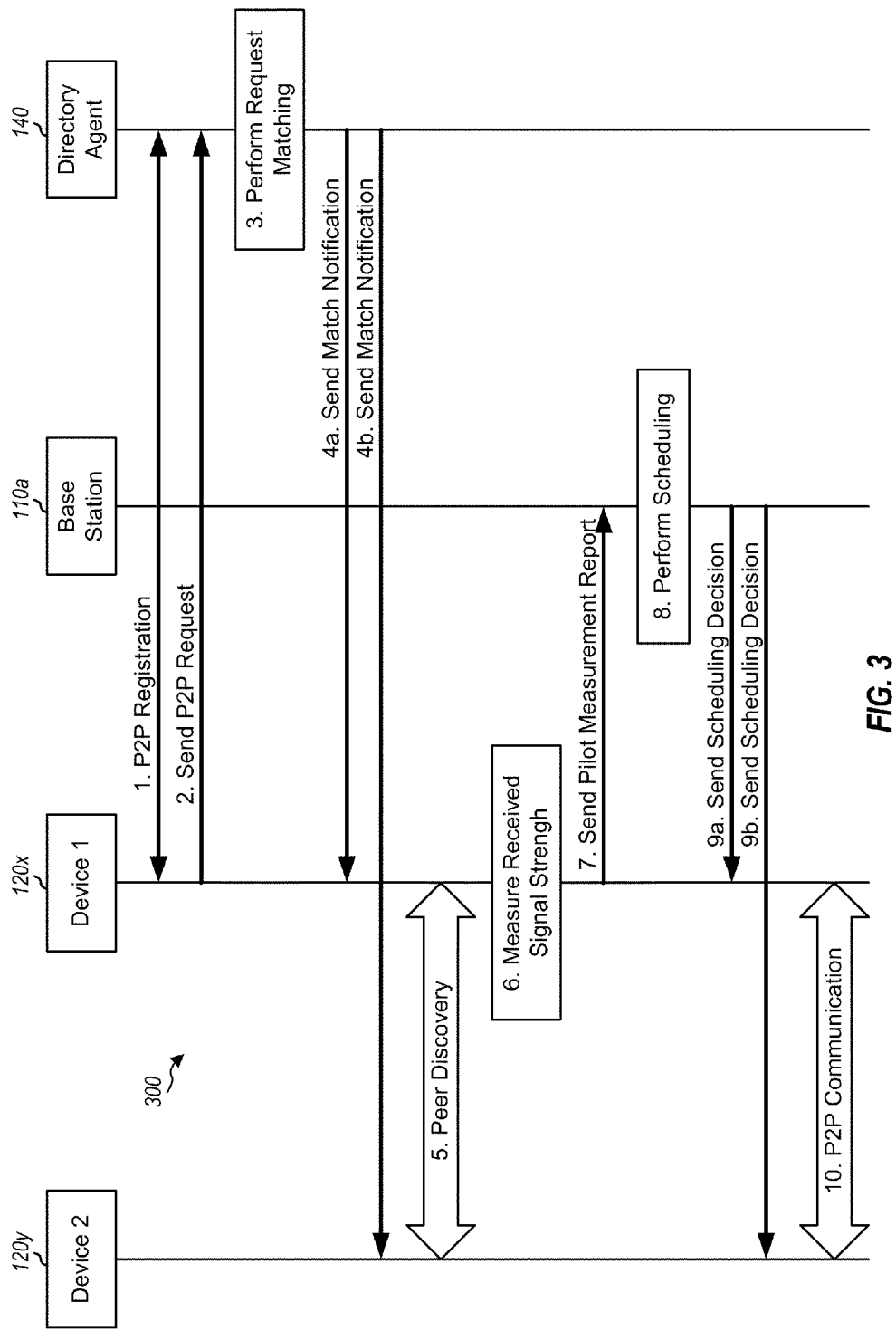
FIG. 3 shows a message flow for network-assisted peer discovery.

FIG. 3 shows a flow diagram of a design of a process 300 for network-assisted peer discovery. Device 120x may register itself with directory agent 140 (or some other designated network entity) based on some trigger (step 1). For example, device 120x may register with directory agent 140 upon entering WAN coverage, e.g., upon detecting a macro cell in wireless network 100. Device 120x may also register with directory agent 140 to request one or more services, to advertise one or more services, to query for peer devices near the vicinity of device 120x, etc. Directory agent 140 may or may not be part of wireless network 100.

Device 120x may provide pertinent information to directory agent 140 as part of P2P registration. In one design, device 120x may provide identification information identifying device 120x, service information identify one or more services offered and/or requested by device 120x, location information for device 120x, etc. The identification information may comprise a device identity (ID) of device 120x. A device ID may have a suitable length (e.g., 12 bits or some other number of bits) to ensure uniqueness with sufficiently high probability. The service information may include one or more service IDs for one or more services offered by device 120x and/or one or more services requested by device 120x. A number of services may be defined/supported, and each service may be assigned a different service ID to identify that service. A group of related services may also be defined and assigned a service ID. A 'wildcard' service may also be defined and may cover all services. A service ID may be a string or an index of a suitable length (e.g., 12 bits or some other number of bits) that can uniquely identify a service, a group of services, or all services. The location information may provide a coarse or an accurate geographical location of device 120x. For example, the location information may provide a tracking area of device 120x or the location of a serving base station of device 120x as a coarse location of device 120x. The location information may also provide an accurate location estimate for device 120x, which may be obtained based on a Global Navigation Satellite System (GNSS) such as Global Positioning System (GPS).

Device 120x may perform P2P registration to advertise its services and/or to obtain services. In one design, device 120x may send a P2P request at the time of P2P registration (step 2). The P2P request may indicate one or more services offered by device 120x and/or one or more services requested by device 120x. For example, device 120x may run a particular P2P gaming application and may send a P2P request indicating a desire to seek partners for a particular game. A P2P request may also be for a wildcard service, which may imply that device 120x is searching for all available services.

In one design, device 120x may submit a new P2P request or update an existing P2P request at any time after P2P registration. An updated P2P request may be sent due to various reasons such as a change in the operating status of device 120x, a change in the geographical location of device 120x, a change in the battery status of device 120x, etc. A change in the battery status may preclude device 120x from offering certain services advertised earlier and/or obtaining certain services requested earlier.

In general, a P2P request may be sent explicitly by device 120x or may be implicit and not sent. A P2P request may also be a transient request or a persistent request. A transient request may be valid for a predetermined period of time, which may typically be a short duration. A persistent request may be valid for an extended time period or indefinitely until it is explicitly canceled by a requesting device or removed by directory agent 140 due to some trigger. In one design, a P2P request may be associated with a time period in which the P2P request is valid and may be discarded after this time period.

Directory agent 140 may perform P2P registration of devices and may maintain a list of active P2P requests from these devices. Directory agent 140 may perform request matching, examine the P2P requests from different devices, and identify devices with matching P2P requests (step 3). Matching may be performed based on various criteria such as the services being offered, the services being requested, the capabilities of the devices, the locations of the devices, etc. For example, a match may be declared between devices 120x and 120y due to device 120x offering a service that is requested by device 120y, or vice versa. A match may also require the two devices to be within RF range of one another, which may be determined based on the location information provided by the devices during P2P registration.

If a match is found for device 120x, then directory agent 140 may send a notification of the match to device 120x (step 4a). Directory agent 140 may also notify device 120y, which may have performed P2P registration with directory agent 140 earlier and may be part of the match for device 120x (step 4b). The match notifications may inform devices 120x and 120y to initiate peer discovery, if needed.

Devices 120x and 120y may perform peer discovery in response to receiving the match notifications from directory agent 140 (step 5). Peer discovery may refer to the overall process to detect the presence of other devices, which may include steps 1 to 5 in FIG. 3 for network-assisted peer discovery. Peer discovery may also refer to the actual detection of other devices, which may include only step 5 in FIG. 3. The actual detection of other devices in step 5 may also be referred as PHY discovery, RF discovery, etc.

Peer/PHY discovery may be performed to determine whether two or more matched devices are in sufficient RF proximity in order to establish a direct data connection without involving a wireless network. Detection of RF proximity may also be useful for other purposes even if direct data communication is not desired. For example, in large open spaces, RF proximity may be considered a good approximation of geographical proximity. In one design of peer/PHY discovery, device 120x may transmit a proximity detection signal to enable device 120y to detect device 120x. Device 120y may detect the proximity detection signal from device 120x. Alternatively or additionally, device 120y may transmit a proximity detection signal to enable device 120x to detect device 120y. Device 120x may then detect the proximity detection signal from device 120y.

In one design, devices 120x and 120y may perform peer/PHY discovery without assistance from the network. For example, devices 120x and 120y may have a default set of proximity detection signals to use for peer/PHY discovery. In one design, a proximity detection signal may include a device ID that identifies a device transmitting the proximity detection signal. A proximity detection signal may also include other information such as a service ID that identifies one or more services being offered or requested.

In another design, devices 120x and 120y may perform peer/PHY discovery with assistance from the network (not shown in FIG. 3). In this design, directory agent 140 may notify serving base station 110a about the match between devices 120x and 120y to enable base station 110a to assist these devices perform peer/PHY discovery. Base station 110a may determine one or more parameters for peer/PHY discovery such as (i) which particular pilot sequence to use for a proximity detection signal, (ii) which device should transmit the proximity detection signal and which device should receive the signal, (iii) time and frequency resources to use to transmit the proximity detection signal, (iv) transmit power level of the proximity detection signal, and/or (v) other parameters. These parameters may be selected by considering the long-term channel quality of devices 120x and 120y, so that lower interference can be observed in detection of the proximity detection signal, which may increase discovery range.

In one design, each device in a group of matched devices may transmit a proximity detection signal and also detect proximity detection signals from other devices in the group. Each device may alternate between (i) a transmit state in which the device transmits its proximity detection signal and (ii) a listen/receive state in which the device detects proximity detection signals from other devices. In another design, one device in a group of matched devices may be requested to transmit a proximity detection signal, and all other devices in the group may be requested to detect the proximity detection signal. In general, the number of devices to transmit proximity detection signals may be depending on the number of devices and the type of devices associated with a match. The goal of peer discovery may be to maximize the probability of peer detection while maintaining energy efficiency. In any case, peer/PHY discovery may allow devices 120x and 120y to determine whether they are within RF proximity and can establish a direct data connection.

In one design, device 120x may measure the received signal strength of the proximity detection signal from device 120y (step 6). The received signal strength may be measured by correlating a received signal at device 120x with an expected pilot sequence for the proximity detection signal transmitted by device 120y. In one design, device 120x may also measure a downlink pilot from its serving base station 110a. Device 120x may send a pilot measurement report and possibly other information to serving base station 110a (step 7). The pilot measurement report may include (i) the received signal strength of the proximity detection signal from device 120y and/or (ii) the received signal strength of the downlink pilot from serving base station 110a. The other information may include timing information for device 120y, e.g., a timing offset of a correlation peak for the proximity detection signal from device 120y with respect to the downlink timing of serving base station 110a. Alternatively or additionally, device 120y may measure the received signal strength of the proximity detection signal from device 120x and/or the downlink pilot from base station 110a and may send a pilot measurement report to base station 110a (not shown in FIG. 3). In general, any device that receives a proximity detection signal from another device may measure the received signal strength of the proximity detection signal and send a pilot measurement report.

In one design, serving base station 110a (or some other designated network entity) may select P2P communication or WAN communication for devices 120x and 120y (step 8). For example, P2P communication may be selected if the received signal strength of the proximity detection signal measured by device 120x or 120y indicates that the quality of the wireless channel between devices 120x and 120y is sufficiently good, e.g., if the received signal strength exceeds a threshold. Conversely, WAN communication may be selected for devices 120x and 120y if the received signal strength is insufficient, e.g., below the threshold. In one design, even if P2P communication is selected, a WAN connection may be established for devices 120x and 120y as a backup.

Serving base station 110a may send a scheduling decision to devices 120x and 120y (steps 9a and 9b). The scheduling decision may indicate whether P2P communication or WAN communication is selected for devices 120x and 120y. The scheduling decision may also convey resources to use for P2P communication or WAN communication. Devices 120x and 120y may then communicate in accordance with the scheduling decision, e.g., communicate peer-to-peer as shown in FIG. 3 (step 10).

In general, the radio technology used for peer discovery in step 5 may or may not be the same as the radio technology used for P2P communication in step 10. For example, peer discovery may be performed using LTE whereas P2P communication may occur using Wi-Fi.

FIG. 3 shows a specific design of network-assisted peer discovery. In this design, the steps involving P2P request and request matching may be performed first, and the steps involving peer/PHY discovery and pilot measurement reporting may be performed later.

In another design, device 120x may first perform peer/PHY discovery to detect other devices in its vicinity. Device 120x may then report the received signal strength and a device ID and/or a service ID of each detected device along with a P2P request to directory agent 140. The device ID and/or service ID of each detected device may be obtained from a proximity detection signal transmitted by that device. The service ID of each detected device may be used by directory agent 140 to identify the service(s) associated with that device, which may be useful for request matching. This design may be particularly advantageous when there are few active devices in the vicinity of device 120x. In this case, device 120x can attempt to discover these active devices and provide directory agent 140 with a smaller set of candidate devices that are known to be in RF proximity of device 120x. Directory agent 140 may match the P2P request from device 120x with the P2P requests from the devices detected by device 120x.

In one design, devices 120x and 120y may perform peer/PHY discovery with network assistance, as described above. In this design, the network (e.g., serving base station 110a) may provide a set of parameters to use for peer/PHY discovery. These parameters may be negotiated by neighboring base stations to provide good performance. For example, different sets of resources and/or different sets of proximity detection signals may be reserved for peer/PHY discovery by devices served by different base stations. Each base station may then assign resources in its allocated set of resources and/or assign proximity detection signals in its allocated set of proximity detection signals to devices within its coverage for peer/PHY discovery. Peer/PHY discovery may be more efficient with network assistance.

In another design, devices 120x and 120y may perform peer/PHY discovery without explicit network assistance. This may be achieved in various manners. In one design, devices 120x and 120y may perform peer/PHY discovery using default parameters, which may comprise a set of default proximity detection signals, specific resources reserved for transmission of proximity detection signal, etc. The default parameters for peer/PHY discovery may be known by devices 120x and 120y or may be broadcast by wireless network 100.

In another design of performing peer/PHY discovery without explicit network assistance, devices 120x and 120y may negotiate parameters to use for peer/PHY discovery. For example, devices 120x and 120y may engage in WAN communication via wireless network 100 to set up a direct Internet Protocol (IP) connection with each other. Devices 120x and 120y may communicate via this IP connection to negotiate parameters to use for peer/PHY discovery. Devices 120x and 120y may then perform peer/PHY discovery based on the negotiated parameters. In this design, directory agent 140 may provide the IP addresses of matched devices 120x and 120y, e.g., provide the IP address of device 120x to device 120y and/or provide the IP address of device 120y to device 120x.

Devices 120x and 120y may perform peer/PHY discovery without network assistance in other manners. RF proximity between devices 120x and 120y may be determined by the peer/PHY discovery without explicit network assistance.

FIG. 3 shows a design of network-assisted communication. In this design, the network (e.g., serving base station 110a) may select P2P communication or WAN communication for devices 120x and 120y and may also schedule the devices for WAN communication or P2P communication (e.g., assign resources to use for communication). In another design, P2P communication may be established without explicit network assistance. For example, wireless network 100 may set aside some semi-statically reserve resources for P2P communication. Devices 120x and 120y may negotiate with each other for P2P communication (e.g., select resources to use for P2P communication). Devices 120x and 120y may use the network only to establish an IP connection to facilitate exchange of messages for negotiation.

In general, all or some of the steps in FIG. 3 may be performed for network-assisted peer discovery and P2P communication. For example, steps 1, 3 and 4a/4b may be performed to support network-assisted peer discovery. Devices 120x and 120y may then perform peer/PHY discovery in step 5 and initiate P2P communication in step 10 without network assistance.

An advantage of network-assisted peer discovery is that the devices may perform peer/PHY discovery by transmitting and/or receiving proximity detection signals only after a match has been detected. This may result in significant battery savings for devices, especially when searching for services that may appear infrequently in time and/or may be sparsely distributed in space. The power savings may be especially beneficial for power-limited devices. Peer/PHY discovery may be performed with or without further network assistance.

Directory agent 140 may support network-assisted peer discovery, perform P2P registration for devices, receive P2P requests from devices, and perform request matching, as described above. In one design, directory agent 140 may be external to wireless network 100 and may be operated by a separate entity. For example, a game developer may have a game server that can handle requests for one or more games with P2P capability. Directory agent 140 may be part of the game server and may operate like a search engine such as an Internet search engine. In another design, directory agent 140 may be part of wireless network 100. For example, a network operator providing cellular access may deploy directory agent 140 in a core network to match P2P requests across different applications.

In one design, directory agent 140 may be used for a specific application. For example, an application such as Facebook may chose to deploy one common directory agent across different wireless networks to support the application. In another design, directory agent 140 may be used for more than one application. For example, a network operator may deploy directory agent 140 to handle different applications supported by wireless network 100.

In the design shown in FIG. 3, network assistance may be used for peer/PHY discovery in step 5 and scheduling for communication in step 8. A network may allocate resources for transmission of proximity detection signals. The network may also use pilot measurement reports to determine RF proximity between the devices and may assign resources for P2P communication. One or more network entities may be designated to perform these tasks.

In another aspect, devices may perform peer discovery without network assistance. In one design, a device may transmit a proximity detection signal that may include a service ID and a service request flag. The service ID may identify one or more services provided by the device and/or one or more services requested by the device. The service request flag may indicate whether the device is (i) a server providing the services indicated by the service ID or (ii) a client consuming the services indicated by the service ID. The service ID may also be for a 'wildcard' service, which may include all services. The device may transmit the proximity detection signal occasionally (e.g., periodically) or when triggered by an event. The event may correspond to the device being turned on, or an application becoming active on the device, or a change in the location of the device, or some other condition. Each device may listen for proximity detection signals from other devices. Each device may obtain a service request from each detected proximity detection signal and may determine whether the detected device provides the requested service(s) and/or desires the offered service(s), as indicated by the service request. Each device that can provide the requested service(s) or desires the offered service(s) may begin transmitting its proximity detection signal, e.g., at a more frequent rate to enable faster discovery. A device may transmit a request for a 'wildcard' service to indicate that the device is interested in all services in its vicinity. A device that receives a request for a 'wildcard' service may begin transmitting its proximity detection signal to enable peer discovery.

Figures 4, 5:
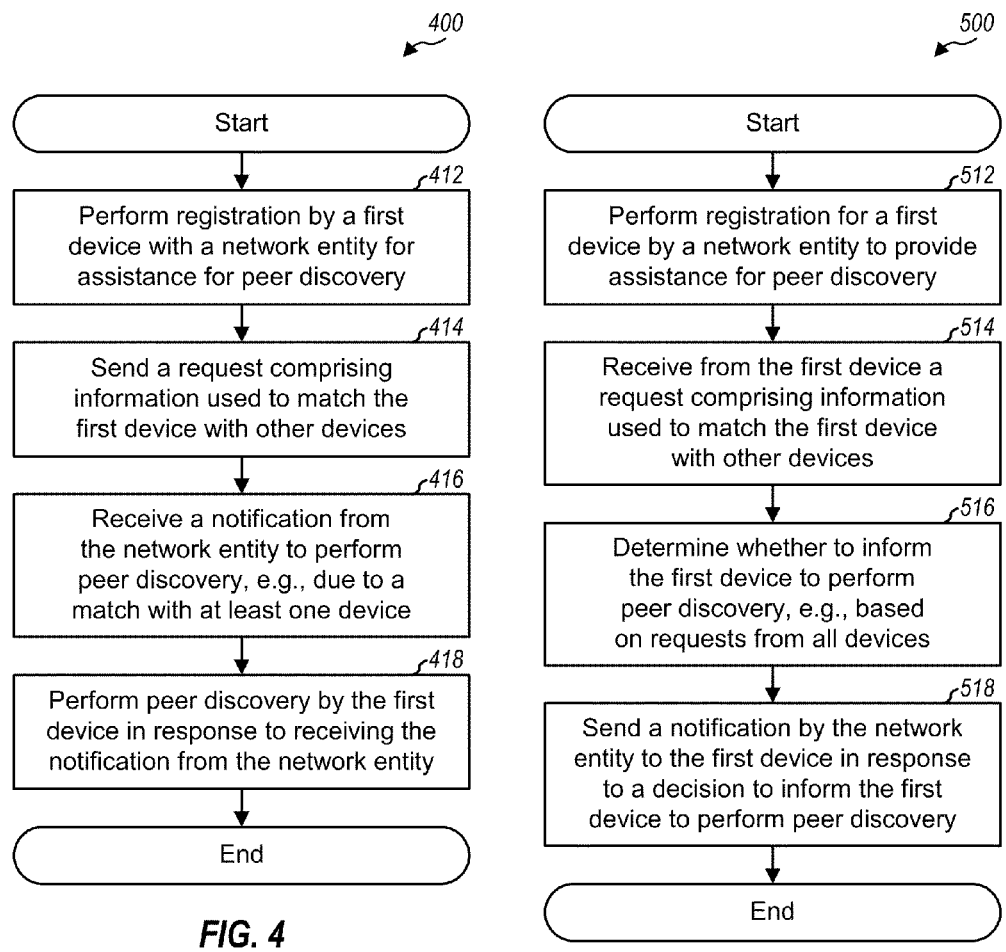
FIG. 4 shows a process for performing network-assisted peer discovery.
FIG. 5 shows a process for supporting network-assisted peer discovery.

FIG. 4 shows a design of a process 400 for performing network-assisted peer discovery. Process 400 may be performed by a first device (as described below) or by some other entity. The first device may perform registration with a network entity (e.g., a directory agent) for assistance for peer discovery (block 412). For registration, the first device may send identification information, location information, service information, and/or other information for the first device to the network entity.

The first device may send a request to the network entity, e.g., during or after registration (block 414). The request may comprise information used to match the first device with other devices, e.g., information indicative of at least one service provided by the first device, or at least one service requested by the first device, or a wildcard service indicating that the first device is requesting all available services, or some other service. The request may be (i) valid for a predetermined period of time or (ii) persistent and valid until canceled by the first device or removed by the network entity based on a trigger. The first device may send an updated request to the network entity due to a change in operating status of the first device, or a change in the location of the first device, or a change in battery status of the first device, or for some other reason.

The first device may receive a notification from the network entity to perform peer discovery (block 416). The notification may be generated by the network entity based on a match between the first device and at least one other device. The match may be determined based on the request from the first device and requests from other devices.

The first device may perform peer discovery in response to receiving the notification from the network entity (block 418). In one design, the first device may perform peer discovery only when triggered by notifications from the network entity when network-assisted peer discovery is invoked, which may save battery power. In another design, the first device may autonomously perform peer discovery (e.g., occasionally) and may also perform peer discovery when informed by the network entity.

In one design, the first device may perform peer discovery by transmitting a proximity detection signal to announce its presence and enable at least one other device to detect the first device. Alternatively or additionally, the first device may perform peer discovery by detecting at least one proximity detection signal transmitted by at least one other device. In general, the first device may perform peer discovery by transmitting and/or receiving proximity detection signals.

In one design, network assistance may be used for peer discovery. The first device may receive at least one parameter to use for peer discovery from a network and may perform peer discovery in accordance with the at least one parameter. The at least one parameter mat indicate whether to transmit a proximity detection signal, a particular pilot sequence to use for the proximity detection signal, time-frequency resources to use to transmit the proximity detection signal, whether to receive proximity detection signals, time-frequency resources on which to receive proximity detection signals, some other parameter, or a combination thereof.

In another design, peer-to-peer negotiation may be used to aid peer discovery. In one design, the first device may receive an address of a second device from the network entity. The first device may establish a connection with the second device via a network based on the address of the second device. The first device may then communicate with the second device via the connection to determine at least one parameter to use for peer discovery. The first device may perform peer discovery in accordance with the at least one parameter.

In one design, network assistance may be used to determine which type of communication to employ. The first device may detect the second device via peer discovery and may measure the received signal strength of a proximity detection signal from the second device. The first device may report the received signal strength of the second device to the network (e.g., to a serving base station of the first device). The first device may receive an indication to use P2P communication or WAN communication between the first and second devices. The first device may communicate with the second device via P2P communication or WAN communication, as conveyed by the indication.

In one design, the same radio technology may be used for both peer discovery and communication. In another design, different radio technologies may be used for peer discovery and communication. In this design, the first device may perform peer discovery based on a first radio technology and may communicate directly with the second device based on a second radio technology, which may be different from the first radio technology.

FIG. 5 shows a design of a process 500 for supporting peer discovery. Process 500 may be performed by a network entity (e.g., a directory agent) as described below or by some other entity. The network entity may perform registration for a first device to provide assistance for peer discovery (block 512). The network entity may receive identification information, location information, service information, and/or other information for the first device as part of registration.

The network entity may receive a request from the first device, e.g., during or after registration (block 514). The request may comprise information used to match the first device with other devices. The network entity may retain the request (i) for a predetermined period of time or (ii) until the request is canceled by the first device or is removed by the network entity based on a trigger. The network entity may also receive an updated request from the first device due to a change in operating status of the first device, or a change in the location of the first device, or a change in battery status of the first device, etc.

The network entity may determine whether to inform the first device to perform peer discovery (block 516). The network entity may send a notification to the first device in response to a decision to inform the first device to perform peer discovery (block 518). In one design, the network entity may perform request matching to match requests from a plurality of devices including the first device. The network entity may determine a match between the first device and at least one other device based on the requests from the first device and the at least one other device, location information for the devices, etc. The network entity may determine to inform the first device to perform peer discovery based on the match between the first device and the at least one other device.

In one design, to support peer discovery, the network entity may send an address of a second device (which may be part of the match) to the first device. The first device may establish a connection with the second device via a network based on the address of the second device. The first device may then communicate with the second device to determine at least one parameter to use for peer discovery.

In one design, the network entity may be external to a network and may perform registration and request matching for devices in one or more networks. In another design, the network entity may be part of a network and may perform registration and request matching for devices in the network. In one design, the network entity may provide assistance for peer discovery for a particular application. In another design, the network entity may provide assistance for peer discovery for devices for a plurality of applications.

FIG. 6 shows a design of a process 600 for performing peer discovery. Process 600 may be performed by a first device (as described below) or by some other entity. The first device may perform peer discovery (block 612) and may detect at least one device via peer discovery (block 614). The first device may measure received signal strength of at least one proximity detection signal from the at least one device (block 616). The first device may obtain a device ID of each of the at least one device based on the proximity detection signal received from that device. The first device may report the received signal strength and identification information for the at least one device to a network (block 618). The identification information may comprise the device ID of each device.

The first device may receive information related to one or more devices among the at least one device from the network (block 620). In one design, the one or more devices may match the first device, and the first device may perform peer discovery to detect the one or more devices. In another design, the first device may determine whether to engage in P2P communication with any of the one or more devices based on the information received from the network (block 622).

In one design, for network-assisted peer discovery, the first device may send to the network a request comprising information used to match the first device with other devices. The first device may receive a notification to perform peer discovery from the network. The notification may be determined based on the request from the first device and other information (e.g., the received signal strength and the identification information for the at least one device) reported to the network by the first device. The notification may be generated due to a match between the first device and one or more other devices. The first device may perform peer discovery in response to receiving the notification from the network.

FIG. 7 shows a design of a process 700 for supporting peer/PHY discovery. Process 700 may be performed by a network entity, which may be a base station, a network controller, etc. The network entity may receive a notification of a plurality of devices designated to perform peer discovery (block 712). The network entity may determine at least one parameter to use for peer discovery by the plurality of devices (block 714). The at least one parameter may indicate whether to transmit a proximity detection signal, or a particular pilot sequence to use for the proximity detection signal, or time-frequency resources to use to transmit the proximity detection signal, or whether to receive proximity detection signals, or time-frequency resources on which to receive proximity detection signals, or some other parameter, or a combination thereof. The network entity may send the at least one parameter to at least one device among the plurality of devices (block 716).

In one design, the network entity may receive a pilot measurement report from a first device. The pilot measurement report may comprise received signal strength of a proximity detection signal from a second device detected by the first device via peer discovery. The network entity may select P2P communication or WAN communication for the first and second devices based on the pilot measurement report. In one design, the network entity may select P2P communication if the received signal strength is above a threshold and may select WAN communication if the received signal strength is below the threshold. The network entity may also select P2P communication or WAN communication based on other criteria. The network entity may send an indication to use P2P communication or WAN communication to the first device.

FIG. 8A shows a block diagram of a design of a device 120u, which may be one of the devices in FIG. 1. Within device 120u, a receiver 812 may receive P2P signals transmitted by other devices for P2P communication and downlink signals transmitted by base stations for WAN communication. A transmitter 814 may transmit P2P signals to other devices for P2P communication and uplink signals to base stations for WAN communication. A module 816 may detect proximity detection signals transmitted by other devices for peer discovery. A module 818 may generate and transmit a proximity detection signal for peer discovery.

A module 820 may support network-assisted peer discovery and may perform P2P registration with directory agent 140, generate and send P2P requests, receive notifications, and initiate peer discovery in response to the notifications. A module 822 may measure received signal strength of proximity detection signals from other devices and downlink pilots from base stations. Module 822 may generate pilot measurement reports comprising the received signal strengths of devices and base stations of interest and may send the pilot measurement reports, e.g., to a serving base station.

A module 824 may support P2P communication, e.g., generate and process signals used for P2P communication. A module 826 may support WAN communication, e.g., generate and process signals used for WAN communication. The various modules within device 120u may operate as described above. A controller/processor 828 may direct the operation of various modules within device 120u. A memory 830 may store data and program codes for device 120u.

FIG. 8B shows a block diagram of a design of a base station 110u, which may be one of the base stations in FIG. 1. Within base station 110u, a receiver 842 may receive uplink signals transmitted by UEs for WAN communication. A transmitter 844 may transmit downlink signals to UEs for WAN communication. A module 846 may receive pilot measurement reports from devices. A scheduler 848 may select P2P communication or WAN communication for devices based on the pilot measurement reports and may allocate resources to the scheduled devices.

A module 850 may support WAN communication for UEs, e.g., generate and process signals used for WAN communication. A module 852 may support communication with other network entities (e.g., other base stations, network controllers, directory agent 140, etc.) via the backhaul. The various modules within base station 110u may operate as described above. A controller/processor 854 may direct the operation of various modules within base station 110u. A memory 856 may store data and program codes for base station 110u.

FIG. 8C shows a block diagram of a directory agent 140u, which may be one design of directory agent 140 in FIG. 1. Within directory agent 140u, a module 872 may perform P2P registration for devices seeking assistance for peer discovery. A module 874 may perform request matching to identify devices that match other devices. A module 876 may send notifications to matched devices. A module 878 may support communication with other network entities (e.g., network controllers, base stations, etc.) via the backhaul. A controller/processor 880 may direct the operation of various modules within the directory agent. A memory 882 may store data and program codes for the directory agent.

The modules within device 120u in FIG. 8A, base station 110u in FIG. 8B, and directory agent 140u in FIG. 8C may comprise processors, electronic devices, hardware devices, electronic components, logical circuits, memories, software codes, firmware codes, etc., or any combination thereof.

Figure 9:
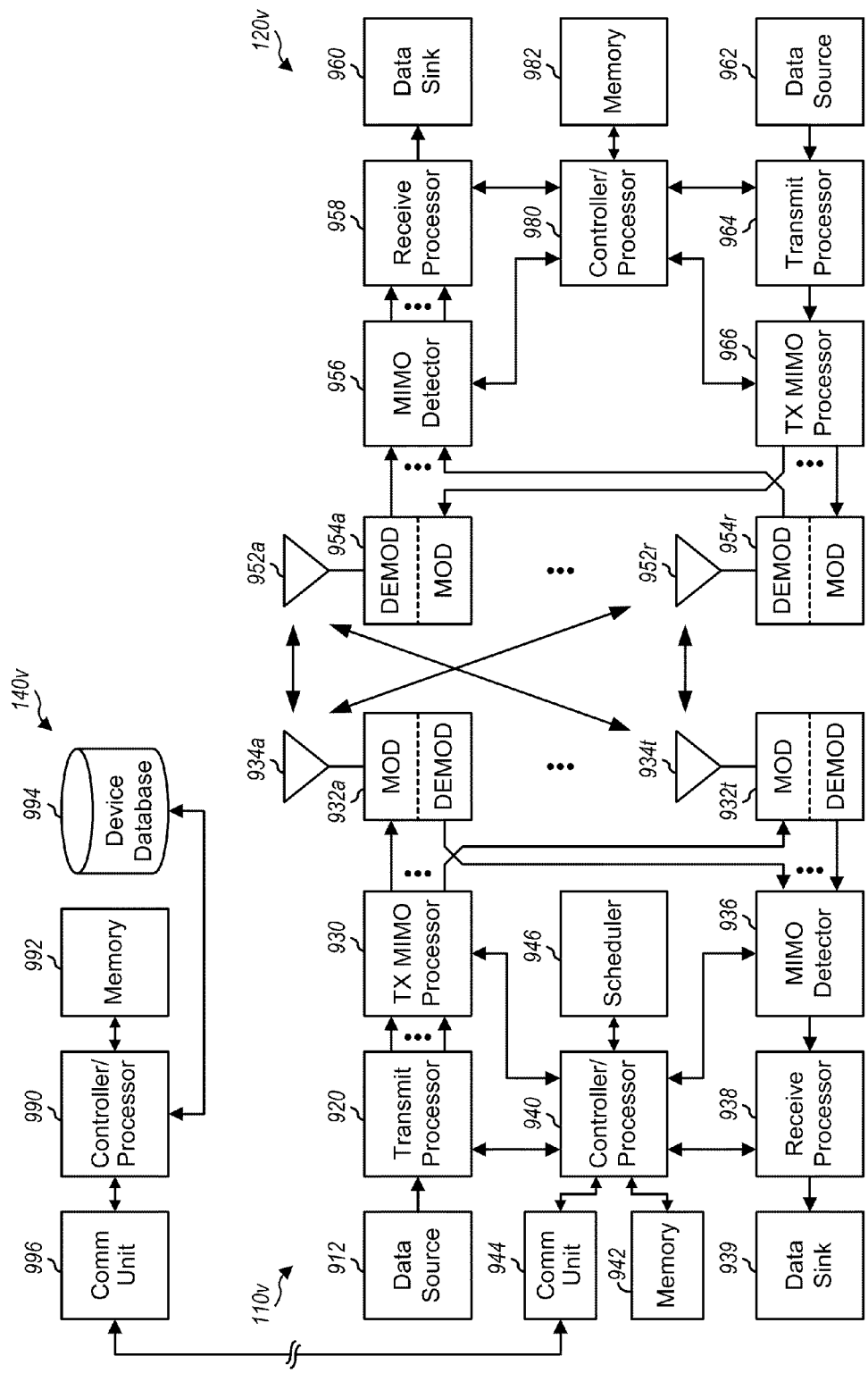
FIG. 9 shows a block diagram of another design of a device, a base station, and a directory agent.

FIG. 9 shows a block diagram of a base station 110v, a device 120v, and a directory agent 140v, which may be another design of a device, a base station, and directory agent 140 in FIG. 1. Base station 110v may be equipped with T antennas 934a through 934t, and device 120v may be equipped with R antennas 952a through 952r, where in general $T \geq 1$ and $R \geq 1$.

At base station 110v, a transmit processor 920 may receive data from a data source 912 and control information (e.g., messages supporting peer discovery) from a controller/processor 940. Processor 920 may process (e.g., encode and modulate) the data and control information to obtain data symbols and control symbols, respectively. Processor 920 may also generate reference symbols for synchronization signals, reference signals, etc. A transmit (TX) multiple-input multiple-output (MIMO) processor 930 may perform spatial processing (e.g., precoding) on the data symbols, the control symbols, and/or the reference symbols, if applicable, and may provide T output symbol streams to T modulators (MODs) 932a through 932t. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At device 120v, antennas 952a through 952r may receive the downlink signals from base station 110v, downlink signals from other base stations, and/or P2P signals from other devices and may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate and decode) the detected symbols, provide decoded data for device 120v to a data sink 960, and provide decoded control information to a controller/processor 980.

On the uplink, at device 120v, a transmit processor 964 may receive data from a data source 962 and control information (e.g., messages for peer discovery) from controller/processor 980. Processor 964 may process (e.g., encode and modulate) the data and control information to obtain data symbols and control symbols, respectively. Processor 964 may also generate reference symbols for a reference signal, a proximity detection signal, etc. The symbols from transmit processor 964 may be precoded by a TX MIMO processor 966 if applicable, further processed by modulators 954a through 954r (e.g., for SC-FDM, OFDM, etc.), and transmitted to base station 110v, other base stations, and/or other devices. At base station 110v, the uplink signals from device 120v and other devices may be received by antennas 934, processed by demodulators 932, detected by a MIMO detector 936 if applicable, and further processed by a receive processor 938 to obtain decoded data and control information sent by device 120v and other devices. Processor 938 may provide the decoded data to a data sink 939 and the decoded control information to controller/processor 940.

Controllers/processors 940 and 980 may direct the operation at base station 110v and device 120v, respectively. Processor 980 and/or other processors and modules at device 120v may perform or direct process 400 in FIG. 4, process 600 in FIG. 6, and/or other processes for the techniques described herein. Processor 940 and/or other processors and modules at base station 110v may perform or direct process 700 in FIG. 7 and/or other processes for the techniques described herein. Memories 942 and 982 may store data and program codes for base station 110v and device 120v, respectively. A communication (Comm) unit 944 may enable base station 110v to communicate with other network entities. A scheduler 946 may schedule devices for WAN communication and P2P communication and may assign resources to the scheduled devices.

Within directory agent 140v, a controller/processor 990 may perform various functions to support peer discovery. Controller/processor 990 may perform P2P registration for devices, receive P2P requests from devices, perform request matching, and provide notifications to initiate peer discovery by matched devices. Controller/processor 990 may also perform process 500 in FIG. 5, process 700 in FIG. 7, and/or other processes for the techniques described herein. A memory 992 may store program codes and data for directory agent 140. A storage unit 994 may store information for devices that have registered with the directory agent, P2P requests from the devices, etc. A communication unit 996 may enable the directory agent to communicate with other network entities.

In one configuration, apparatus 120u or 120v for wireless communication may include means for performing registration by a first device with a network entity for assistance for peer discovery, means for sending a request comprising information used to match the first device with other devices, means for receiving a notification from the network entity to perform peer discovery (e.g., due to a match with at least one device), and means for performing peer discovery by the first device in response to receiving the notification from the network entity.

In another configuration, apparatus 140u or 140v for wireless communication may include means for performing registration for a first device by a network entity to provide assistance for peer discovery, means for receiving from the first device a request comprising information used to match the first device with other devices, means for determining whether to inform the first device to perform peer discovery (e.g., based on requests from all devices), and means for sending a notification by the network entity to the first device in response to a decision to inform the first device to perform peer discovery.

In yet another configuration, apparatus 120u or 120v for wireless communication may include means for performing peer discovery by a first device, means for detecting at least one device by the first device via peer discovery, means for measuring received signal strength of at least one proximity detection signal from the at least one device, means for reporting the received signal strength and identification information for the at least one device to a network, means for receiving information related to the at least one device from the network, and means for determining whether to engage in P2P communication with any of the at least one device based on the information received from the network.

In yet another configuration, apparatus 110u or 110v for wireless communication may include means for receiving a notification of a plurality of devices designated to perform peer discovery, means for determining at least one parameter to use for peer discovery by the plurality of devices, and means for sending the at least one parameter to at least one device among the plurality of devices.

In an aspect, the aforementioned means may be processor 940 at base station 110v, or processor 980 at device 120v, or processor 990 at directory agent 140v, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    performing registration by a first device with a network entity for assistance for peer discovery of a peer of the first device;
    receiving a notification from the network entity to perform the peer discovery, using a wide area network (WAN) radio technology;
    receiving, from the network entity or from a second device, at least one parameter to use for the peer discovery;
    performing the peer discovery by the first device in response to receiving the notification from the network entity, including detecting at least one proximity detection signal transmitted by at least one other device in accordance with the at least one parameter using a peer-to-peer (P2P) radio technology different from the WAN radio technology;
    measuring a signal strength of the at least one proximity detection signal;
    reporting the signal strength to the network entity; and
    receiving, in response the reporting, an indication of one of the P2P or WAN radio technologies to use for communicating with the at least one other device.

2. The method of claim 1, wherein the performing registration comprises
    sending identification information, or location information, or both for the first device to the network entity.

3. The method of claim 1, further comprising:
    sending a request from the first device to the network entity, wherein the request comprises information used to match the first device with other devices, and wherein the notification is determined by the network entity based on the request.

4. The method of claim 3, wherein the information used to match the first device with other devices comprises information indicative of at least one service provided by the first device, or at least one service requested by the first device, or a wildcard service indicating that the first device is requesting all available services, or a combination thereof.

5. The method of claim 3, wherein the notification is generated by the network entity based on a match between the first device and at least one other device, the match being determined based on the request from the first device.

6. The method of claim 3, wherein the request is valid for a predetermined period of time.

7. The method of claim 3, wherein the request is valid until canceled by the first device or removed by the network entity based on a trigger.

8. The method of claim 3, further comprising:
    sending an updated request to the network entity due to a change in operating status of the first device, or a change in location of the first device, or a change in battery status of the first device.

9. The method of claim 1, wherein the performing peer discovery comprises transmitting the proximity detection signal by the first device to announce presence of the first device and enable the at least one other device to detect the first device.

10. The method of claim 1, wherein the performing peer discovery comprises detecting the at least one proximity detection signal transmitted by the at least one other device.

11. The method claim 1, wherein the at least one parameter indicates a particular pilot sequence to use for the proximity detection signal, or time-frequency resources to use to transmit the proximity detection signal, or time-frequency resources on which to receive proximity detection signals, or a combination thereof.

12. The method of claim 1, wherein the performing peer discovery comprises
    communicating with the second device via a network by the first device to determine the at least one parameter to use for peer discovery.

13. The method of claim 12, further comprising:
    receiving an address of the second device from the network entity, and
    establishing a connection between the first device and the second device via the network based on the address of the second device.

14. An apparatus for wireless communication, comprising:
    means for performing registration by a first device with a network entity for assistance for peer discovery of a peer of the first device;
    means for receiving a notification from the network entity to perform the peer discovery, using a wide area network (WAN) radio technology;
    means for receiving, from the network entity or from a second device, at least one parameter to use for the peer discovery; and
    means for performing the peer discovery by the first device in response to receiving the notification from the network entity, including detecting at least one proximity detection signal transmitted by at least one other device in accordance with the at least one parameter using a pear-to-peer (P2P) radio technology different from the WAN radio technology;

means for measuring a signal strength of the at least one proximity detection signal;

means for reporting the signal strength to the network entity; and means for receiving, in response the reporting, a indication of one of the P2P or WAN radio technologies to use for communicating with the at least one other device.

15. The apparatus of claim 14, further comprising:

means for sending a request from the first device to the network entity, wherein the request comprises information used to match the first device with other devices, and wherein the notification is determined by the network entity based on the request.

16. The apparatus of claim 14, wherein the means for performing peer discovery comprises means for communicating with the second device via a network to determine the at least one parameter to use for peer discovery.

17. The apparatus of claim 14, further comprising:

means for communicating with the second device via P2P communication or WAN communication as conveyed by the indication.

18. An apparatus for wireless communication, comprising:

at least one processor configured to perform registration by a first device with a network entity for assistance for peer discovery of a peer of the first device, to receive a notification from the network entity to perform the peer discovery, using a wide area network (WAN) radio technology, to receive from the network entity or from a second device, at least one parameter to use for the peer discovery, to perform the peer discovery by the first device in response to receiving the notification from the network entity, including detecting at least one proximity detection signal transmitted by at least one other device in accordance with the at least one parameter using a pear-to-peer (P2P) radio technology different from the WAN radio technology, measuring a signal strength of the at least one proximity detection signal, reporting the signal strength to the network entity, and receiving, in response the reporting, an indication of one of the P2P or WAN radio technologies to use for communicating with the at least one other device.

19. The apparatus of claim 18, wherein the at least one processor is configured to send a request from the first device to the network entity, wherein the request comprises information used to match the first device with other devices, and wherein the notification is determined by the network entity based on the request.

20. The apparatus of claim 18, wherein the at least one processor is configured to communicate with the second device via a network to determine the at least one parameter to use for peer discovery.

21. The apparatus of claim 18, wherein the at least one processor is configured to communicate with the second device via P2P communication or WAN communication as conveyed by the indication.

22. A computer program product, comprising:

a non-transitory computer-readable medium comprising:

code for causing at least one processor to perform registration by a first device with a network entity for assistance for peer discovery of a peer of the first device, via a wide area network (WAN) radio technology, code for causing the at least one processor to receive from the network entity or from a second device, at least one parameter to use for the peer discovery, code for causing the at least one processor to receive a notification from the network entity to perform the peer discovery, and code for causing the at least one processor to perform the peer discovery by the first device in response to receiving the notification from the network entity, including detecting at least one proximity detection signal transmitted by at least one other device in accordance with the at least one parameter using a pear-to-peer (P2P) radio technology different from the WAN radio technology;

code for measuring a signal strength of the at least one proximity detection signal;

code for reporting the signal strength to the network entity; and code for receiving, in response the reporting, an indication of one of the P2P or WAN radio technologies to use for communicating with the at least one other device.

* * * * *